United States Patent
Tooley, II

(10) Patent No.: US 9,436,818 B1
(45) Date of Patent: Sep. 6, 2016

(54) SYSTEM AND METHOD FOR CREDENTIAL MANAGEMENT AND IDENTITY VERIFICATION

(71) Applicant: Macio P. Tooley, II, Melrose Park, IL (US)

(72) Inventor: Macio P. Tooley, II, Melrose Park, IL (US)

( * ) Notice: Subject to any disclaimer, the term of this patent is extended or adjusted under 35 U.S.C. 154(b) by 0 days.

(21) Appl. No.: 14/811,176

(22) Filed: Jul. 28, 2015

Related U.S. Application Data

(63) Continuation-in-part of application No. 14/606,748, filed on Jan. 27, 2015, now abandoned.

(60) Provisional application No. 62/018,838, filed on Jun. 30, 2014.

(51) Int. Cl.
  *G06F 21/32* (2013.01)
  *G06F 21/45* (2013.01)
  *G06F 21/34* (2013.01)

(52) U.S. Cl.
  CPC .............. *G06F 21/32* (2013.01); *G06F 21/34* (2013.01); *G06F 21/45* (2013.01); *G06F 2221/2129* (2013.01)

(58) Field of Classification Search
  CPC ........................... H04L 63/0861; G06F 21/32
  USPC ............................................................ 726/6
  See application file for complete search history.

(56) References Cited

U.S. PATENT DOCUMENTS

| | | | | |
|---|---|---|---|---|
| 2005/0212658 A1* | 9/2005 | Kinsella | ............. | G06K 9/00013 340/5.83 |
| 2006/0056626 A1* | 3/2006 | Keohane | ................. | G06F 21/84 380/206 |
| 2007/0030528 A1* | 2/2007 | Quaeler | ............ | G06F 17/30634 358/453 |
| 2008/0002911 A1* | 1/2008 | Eisen | .................. | G06F 21/6245 382/283 |
| 2009/0154779 A1* | 6/2009 | Satyan | ................... | G06K 9/036 382/124 |
| 2010/0031014 A1* | 2/2010 | Senda | ...................... | G09C 5/00 713/150 |
| 2010/0131551 A1* | 5/2010 | Benzaken | ........... | G06F 21/6245 707/769 |
| 2014/0161033 A1* | 6/2014 | Dowling | ................ | G06Q 20/04 370/328 |
| 2014/0212040 A1* | 7/2014 | Walker | ................. | G06K 9/2081 382/182 |
| 2015/0074615 A1* | 3/2015 | Han | .................... | G06K 9/00033 715/863 |
| 2015/0096001 A1* | 4/2015 | Morikuni | ................ | H04L 63/08 726/7 |
| 2015/0199527 A1* | 7/2015 | Picon | ...................... | G06F 21/31 726/26 |
| 2015/0200922 A1* | 7/2015 | Eschbach | ................ | H04L 63/08 358/1.14 |

(Continued)

OTHER PUBLICATIONS

Aimani et al, Reselling Digital Content, 2010, IEEE, pp. 391-396.*

(Continued)

*Primary Examiner* — Bradley Holder
*Assistant Examiner* — Jenise Jackson
(74) *Attorney, Agent, or Firm* — Dale J. Ream

(57) ABSTRACT

A system of credential management and identity verification includes a portable input device and an application that, when executed on the input device, authenticates a user of the input device and provides associated credentials to a computing device. The application detects a request for credentials presented by a proximate computing device. Then, the application alerts a user of the computing device to confirm his identity by submitting one of a biometric or non-biometric authenticating input to the input device. The authenticating input is received by the input device and used to verify the identity of the user. If the identity is verified, the application transmits the associated encrypted credentials and mask data to the computing device. The input device may be a pointing device connected wirelessly or via wired connection to the computer. User authentication data is provided to the input device at an initial or predetermined time.

19 Claims, 10 Drawing Sheets

(56) References Cited

U.S. PATENT DOCUMENTS

2015/0378973 A1* 12/2015 Korneev ............ G06F 21/6245
  715/256

OTHER PUBLICATIONS

Ye et al, TransSec: Security Image Transporation in Visual Sensor Networks, 2012, IEEE, pp. 584-587.*

* cited by examiner

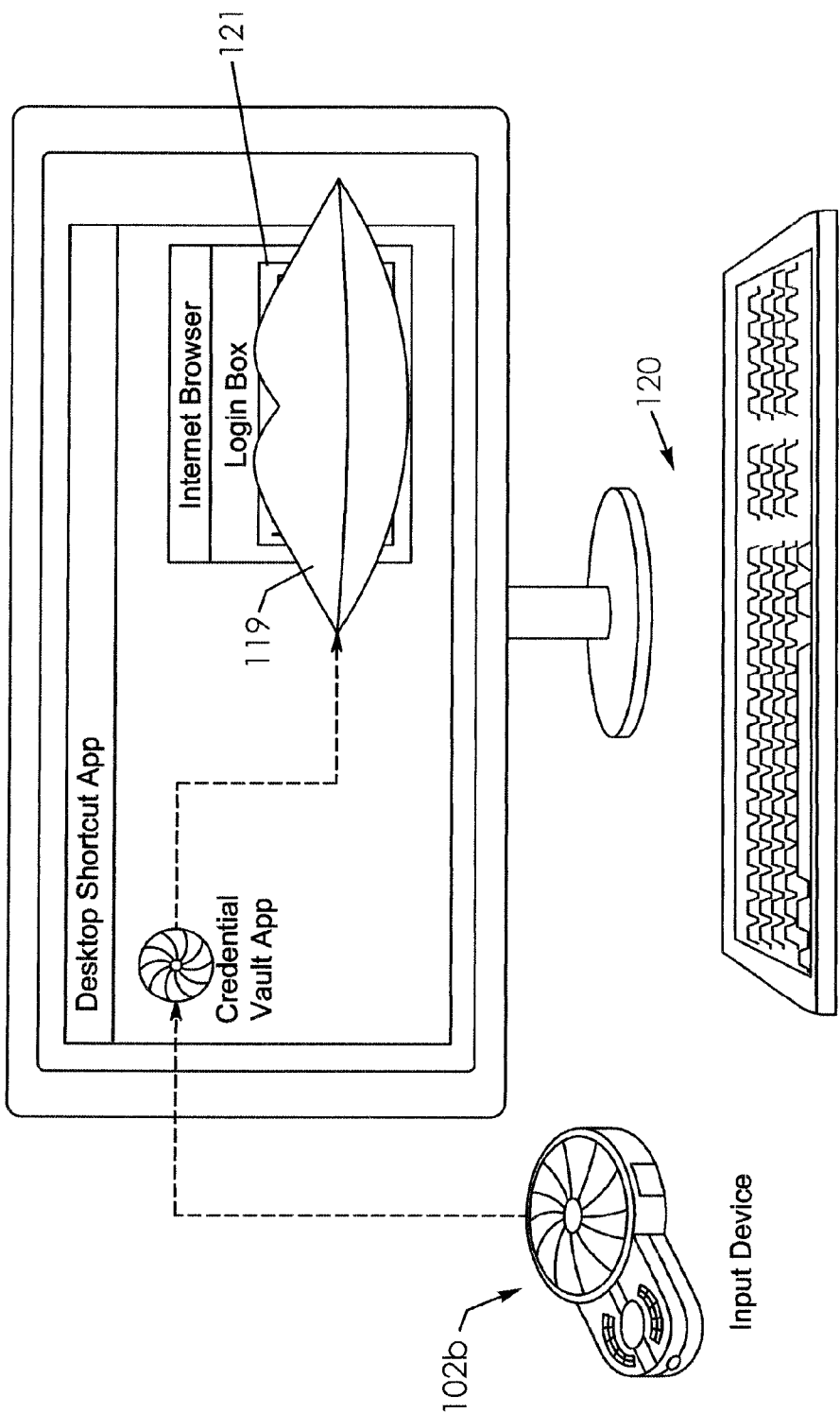

SYSTEM AND METHOD FOR CREDENTIAL MANAGEMENT AND IDENTITY VERIFICATION

CROSS REFERENCE TO RELATED APPLICATIONS

This Continuation-in-Part non-provisional patent application claims the benefit of non-provisional patent application Ser. No. 14/606,748 filed on Jan. 27, 2015, titled System and Method for Credential Management and Identity Verification, which claims the benefit of provisional application Ser. No. 62/018,838 filed on Jun. 30, 2014, titled Login Assistance Device and Method.

FIELD OF THE DISCLOSURE

The present disclosure relates generally to providing security for personal information. More particularly, the present disclosure provides a system and method of an input device detecting a proximate computer displaying a request for credentials, the input device prompting the computer user for input verifying the user's identity, and the input device transmitting encrypted credentials to the computer without the credentials being displayed. In addition, the input device directs a graphical "mask" to be layered in front of the credential request to prevent undesired viewing of credential population into the credential request display field.

BACKGROUND OF THE DISCLOSURE

Users of computers frequently maintain usernames, passwords, account numbers and other information for their relationships with banks, credit card companies, insurance companies, and other providers of services and goods. Remembering and maintaining records of these varied items of information can be onerous and time consuming and may expose users to risks of information loss, fraud, and identity theft.

Other confidential information such as social security numbers, passport information, travel information, dates of birth, and personal identification numbers not related to customer accounts is also valuable and subject to loss and identity theft. When in public settings, users may be uncomfortable with exposing these items of confidential information. A user risks exposure of credential information merely by typing it in when "spectators" might perceive and obtain such information. Various users may be hesitant to enter their passwords in public due to the fact that others might have the opportunity to learn such a password by watching the user type it onto a keyboard.

While various devices have been proposed to manage passwords, users may not like the way in which they must be identified by such devices. Some users may prefer the convenience of using biometric data to identify themselves. Others may have concerns about providing such data and prefer to use non-biometric data. None of the prior art devices offer the unique ability to identify users utilizing both biometric data and non-biometric data alternatively, or provide a highly convenient way to conceal and store login information. Thus, there continues to be a need for a more efficient and effective method for providing a user with login assistance.

Therefore, it would be desirable to have a system and method for managing credentials. Further, it would be desirable to have a system and method for detecting when an associated computer is requesting credentials, verifying that a user of an input device is an authorized user, and transmitting associated credentials to the associated computer. In addition, it would be desirable to have a system and method that displays a "mask" over the a credential request prompt such that the credentials cannot be visually seen by persons proximate the computer display even when being verified, entered, and transmitted automatically by the system and method of the present invention.

SUMMARY OF THE DISCLOSURE

The present invention provides systems and methods of a portable input device transmitting encrypted credentials to a proximate computer based on verification of user identity. The input device detects a request for credentials generated by the proximate (i.e. remote) computer. The input device requests the user of the computer to confirm his/her identity. The computer user provides a biometric entry, for example fingerprint, and/or non-biometric entry to the input device. The input device verifies the user's entry against stored verification files and transmits the encrypted credentials to the computer. The user is then granted access to a desired local or network-based resource whose selection triggered the input device's action. The user does not view and may not even know the transmitted credentials.

In another aspect, the system may provide a "mask" that literally blocks a visual view of the request for credentials by the proximate computer. For instance, when the input device detects a request for credentials, the input device communicates a predetermined image to be displayed on the computer screen directly in front of the credential request. The mask continues to be displayed while the computer user's identity is verified (by biometric or non-biometric data) and associated credentials are transmitted to the requesting computer. Once transmitted, the request itself is removed and, correspondingly, the mask is removed. When the credentials are accepted by the remote computer, of course, access to the remote resource or application is initiated, for example, to a banking website or other membership website.

The input device may be a pointing device or mouse connected wirelessly or via wired connection to the computer. The input device may be a mobile telephone or other portable electronic device. The computer user may be required to enter usernames, passwords, account numbers and other confidential information when accessing software applications and network resources including Internet websites.

The present invention provides for the computer user, when prompted, to provide biometric input, such as a fingerprint, or non-biometric input, to the input device, which confirms the user's identity based on comparison of the user's input with stored verification files. The input device then transmits the username, password or other requested information in encrypted format to the computer. The user is then authenticated or otherwise provided access to the protected resource.

The present invention relieves the user of the need to memorize or otherwise maintain records of account names, passwords or other confidential information. The user effectively bypasses a step that is burdensome for some and may expose the user to risk of fraud and loss.

The input device may store confidential information for numerous protected accounts and resources the user may access. The input device may recognize which account or resource is encountered by the user as the user navigates and browses through screens of the computer. As the user hovers a mouse cursor over a prompt for authentication or clicks in a prompt field, the input device recognizes the associated account or protected resource. The input device recognizes the need for authentication and requests the computer user to provide biometric or non-biometric input which, after verification, enables transmission of encrypted credentials by the input device to the computer that is requesting credentials.

The input device is configurable to provide the systems and methods described herein to more than one user of the computing device. Verification files for each of two or more users may be stored by the input device for verification against entered biometric or non-biometric input. The verification files for each user may be maintained separately and confidentially.

While verification files may be maintained in persistent, nonvolatile storage or memory of the input device, the files may additionally or alternatively be stored in removable media such as a secure digital (SD) card. The user may remove the SD card and insert it into another input device configured as described herein. The removable media may be moved to a second input device configured as described herein. The at least one user whose verification files are stored on the removable media may insert the removable media into the second input device and may receive the services of the present invention described herein.

In addition to user convenience, maintenance of encrypted verification files on removable media may also be of value if the input device is lost or damaged. The removable media is protected such that only the user may access its contents. In an embodiment, the removable media may contain content in addition to encrypted verification files, the content comprising code associated with the functionality of the input device regarding systems and methods provided herein. Mask data may also be stored on removable media as will be described below.

BRIEF DESCRIPTION OF THE DRAWINGS

FIG. 10 is another diagrammatic view as in FIG. 9 illustrating the method of an input device communicating mask data to a computing device resulting in a mask being displayed in a layer completely covering a credential request display field;

DETAILED DESCRIPTION OF THE INVENTION

Figure 1:
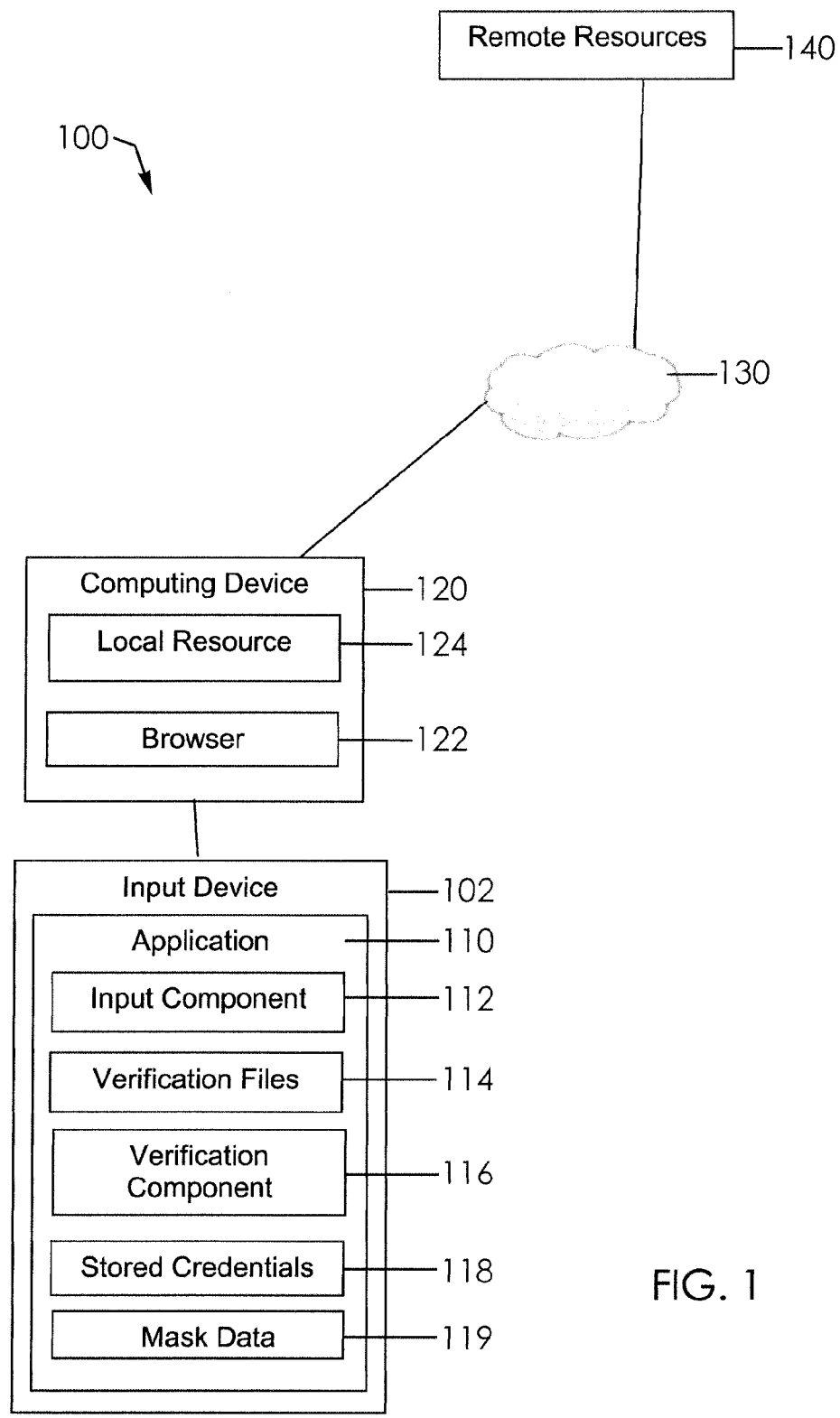
FIG. 1 is a block diagram of a system of credential management and identity verification in accordance with an embodiment of the present disclosure.

The present invention provides a system of credential management and identity verification. The system 100 includes a portable input device 102 and an application 110 that, when executed on the input device 102, detects a request for credentials presented by a proximate computing device 120. The present invention is provided primarily by the application that may be software in nature but may also call for nonreversible customization of some hardware components. The application 110 may include nonvolatile code for specific programming of hardware components of the input device to perform the operations of the present invention. In addition to nonvolatile program code, the application 110 may also include data that may be altered from time to time, such as verification files as described below. The input device 102 may be a pointing device for the computing device or may be a mobile device or personal digital assistant. The system 100 also provides at least one alert to a user of the computing device to confirm identity via submission of at least one of a biometric and a non-biometric input to the input device. The system also receives the at least one of the biometric and non-biometric input, verifies identity of the user based on the received input, and transmits credentials to the computing device 120 based on the verified user identity.

The input device 102 receives the request for credentials in response to the computing device 120 accessing at least one of a locally accessible resource, a resource accessible via a network, and a resource accessible via the Internet. The user may access an application that executes on the computing device and/or a source of data that is stored locally on the computing device wherein the application and/or data is protected such that a screen is generated in which a username and password are required for access. Similarly, the applications, data, and other resources may be accessible via servers or databases in a network that the user may log into from the computing device.

The user may use a browser, client software, or network requester executing on the computing device to request access to the remote resources. A server hosting the desired resources or otherwise providing access thereto to the computing device across a network may cause a screen to be generated on the computing device requesting credentials from the user. In contrast with accessing local or network server based resources, the user of the computing device may seek to access a resource via the Internet. Such a resource may be an Internet web site operated by a bank, for example, where the user's private information may be stored and accessible only upon the user providing credentials. Such an Internet-based resource may be a web site operated by a magazine or newspaper wherein only paying subscribers are allowed access. Such paying subscribers would be required to provide credentials to receive access.

The input device 102 provides the at least one alert using at least one of visible, audible, and vibratory signal. The input device 102 may detect that the computing device has presented a screen to the user that requires credentials. The input device 102 may also detect that user has hovered the cursor over an executable link wherein credentials may be required. Further, the input device may detect that the user has clicked using the mouse in an area or text entry field wherein a user name, password, account number or other confidential information may be entered. In each of these and other situations wherein credentials or other confidential information may be required, the input device 102 provides an alert to the user to enter biometric and/or non-biometric input to the input device 102. The input device 102 is equipped with hardware and software such that at least one of a visible, audible, or tactile alert is provided to the user. The input device 102 may have a light or other device that illuminates such that the user is alerted to provide input. The input device may have speaker that emits an audible sound that alerts the user to provide input. An audio jack, such as a jack for headphones or an earphone may be provided on the input device. The input device may have vibratory functionality such that the input device vibrates to alert the user to provide input and the user feels the emitted vibration. The input device 102 may have a touch screen and a stylus, pen or pointer may be used on the touch screen by the user of the computing device to acknowledge that he/she has taken note of the illuminated, sounded, and/or vibrated alert.

The input device 102 transmits the credentials in encrypted format and does not reveal the credentials to the user. The input device 102 stores a plurality of credentials for a plurality of users of the computer and processes input provided by the plurality of users. The credentials are entered into the input device 102 and stored there when the input device 102 is configured and initialized to provide the services described herein. The credentials may be encrypted at that time and remain encrypted such that if the input device 102 is lost or stolen, the credentials cannot be accessed by a party with ill intent.

The input device 102 may provide alerts customized for each of the plurality of users of the computing device. The input device communicates with the computing device via at least one of a wired and wireless connection. Each user of the input device may choose the type of alerts they desire for particular situation, for example while using the computing device and input device in public or private settings. For example, a first user may prefer vibratory alerts in public and audible alerts when in a private setting. Also, a second user may prefer a visible alert when being prompted for credit card information and a vibratory alert when being prompted for a password to a web site providing paid subscription news content. The input device may be a pointing device or mouse and may be connected to the computing device via a wire. The input device may be a wireless mouse and communicate with the computing device via optical, laser or other wireless near field technologies.

As noted, the input device 102 is a pointing device associated with the computing device. The biometric input includes a fingerprint of the user. The non-biometric input includes machine-readable indicia provided by a portable card.

The present invention also includes a method of credential management and identity verification, the method including a portable input device 102 detecting a request for credentials presented by a proximate computing device and the input device providing at least one alert to a user of the computing device to confirm identity via submission of at least one of a biometric and a non-biometric input to the input device. The method also includes the input device 102 receiving the at least one of the biometric and non-biometric input, the input device verifying identity of the user based on the received input, and the input device 102 transmitting respective credentials associated with the verified user to the computing device.

The method further includes the input device 102 receiving the request for credentials in response to the user of the computing device accessing at least one of a locally accessible resource, a resource accessible via a local network, and a resource accessible via the Internet. The method further includes the input device 102 transmitting the credentials in encrypted format wherein the credentials are not revealed to the user. The method further includes the input device 102 verifying the identity of the user by comparing the at least one of the biometric and non-biometric input with files stored in at least one of persistent storage of the input device and removable storage of the input device.

The method further includes the input device 102 transmitting credentials for a second user of the computing device based on the second user accessing at least one resource accessible locally on the computing device, accessible via a network, and accessible via the Internet and further based on the input device 102 verifying at least one of the biometric and non-biometric input entered by the second user. The method further includes the input device 102 transmitting credentials to a second computing device based on a third user of the second computing device accessing at least one resource accessible locally on the second computing device, accessible via a network, and accessible via the Internet and further based on the input device 102 verifying at least one of the biometric and non-biometric input entered by the third user.

The method further includes the input device 102 detecting the request for credentials based on user action including at least one of navigating about an Internet page containing an authentication prompt, hovering a cursor over an authentication prompt, and clicking within a field accepting the credentials. The method further includes the input device recognizing an account associated with the user action and searches for stored files to compare with the at least one of the biometric and non-biometric input entered by the user.

In another aspect, the method further includes the input device 102 transmitting a visual "mask" 119 to the display of the computing device 120 upon receiving the request for credentials. The mask 119 may be a graphic design, logo, photograph, comedic saying, color pattern, or the like and is dimensioned to completely shield the request for credentials (e.g. a prompt for a username and password) (FIG. 10). Data defining the mask 119 (also referred to as "mask data") may be stored by the input device 102 at setup in the manner in which a user's credentials are stored therein as described previously. In an embodiment, the mask 119 may be transmitted from the input device 102 to the computing device 120 immediately upon detecting a credential request with instructions to immediately position the mask 119 over the credential request. The mask 119 will remain in place while the computer user's identity is verified as described above and associated credentials are transmitted via the credential request back to the requesting computer resource being accessed.

In a related embodiment, data defining more than one mask may be stored by the input device 102 at setup in the manner in which a user's credentials are stored therein as described previously. In fact, mask data defining multiple masks may be associated with specific predetermined credential data of a single user or associated with multiple users, as will be described further later. As an example, a mask 119 having characteristics indicative of closed lips (indicative a "secret") may be associated with the identification data of a respective user as well as with the credentials specific to logging into a banking resource. The input device 102 is configured to identify the credential request received from the banking resource and, upon verifying the identity of the user of the input device 102, to automatically transmit respective of the identified user's credentials to the respective resource (i.e. to respond to the credential request). As another example, the input device 102 may be configured to identify the credential request received from a social media resource (website) and, upon verifying the identity of the user of the input device 102, to automatically transmit the identified user's credential data to the social media resource in response to the credential request.

Figure 9:
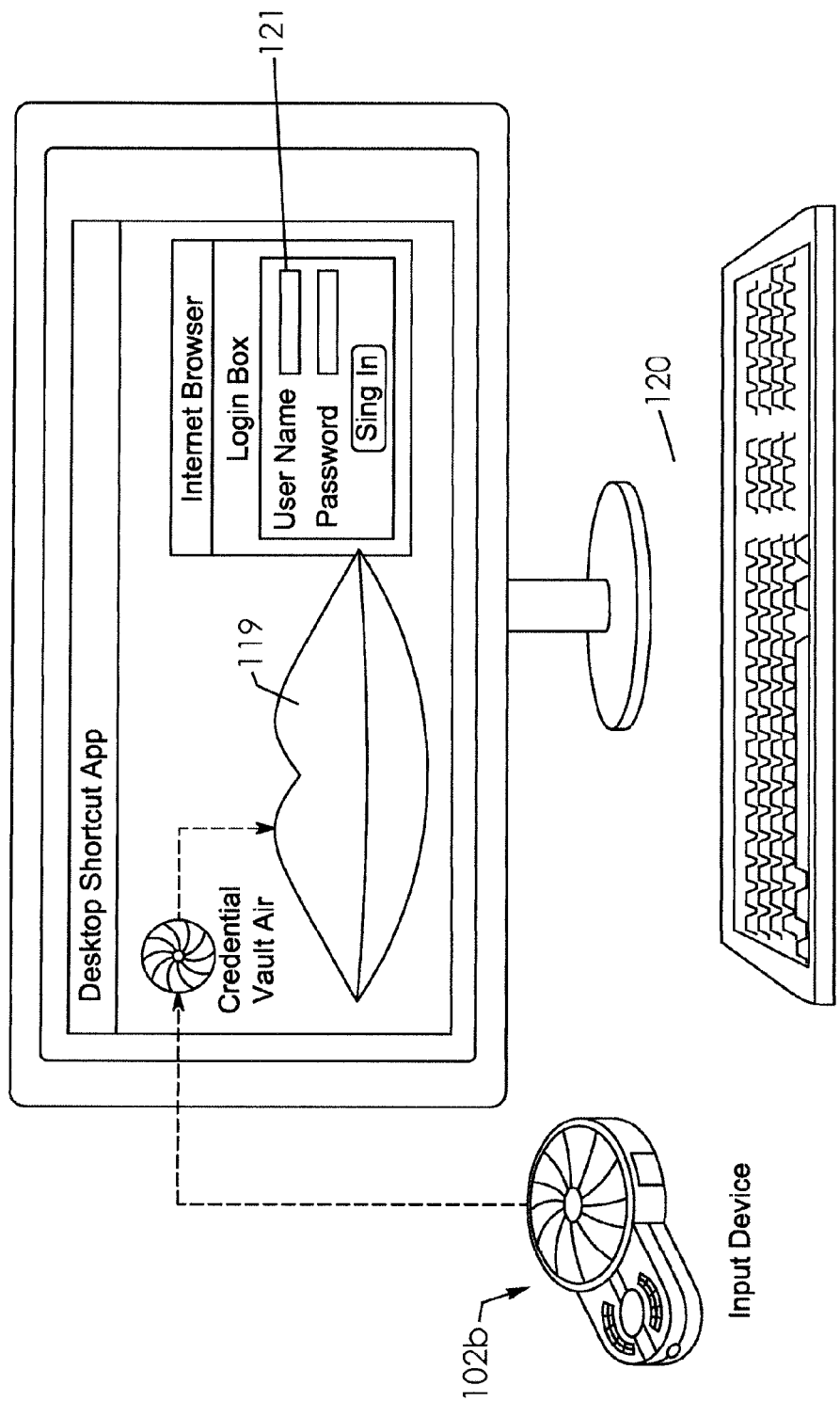
FIG. 9 is a diagrammatic view illustrating the method of an input device communicating mask data to a computing device resulting in a mask being displayed in a layer partially covering a credential request display field.
Figure 11A:
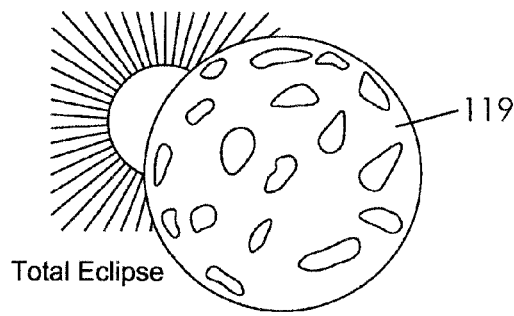
FIGS. 11A to 11J illustrate examples of mask images that may be used in the method shown in FIGS. 9 and 10.
Figure 11D:
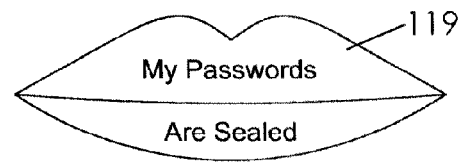
Figure 11B:
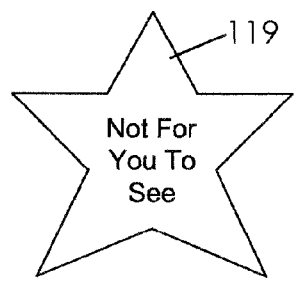
Figure 11E:
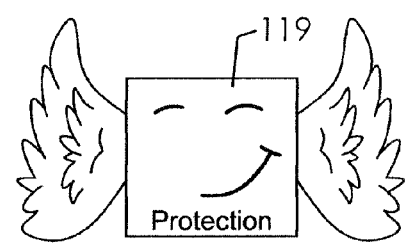
Figure 11C:
Figure 11F:
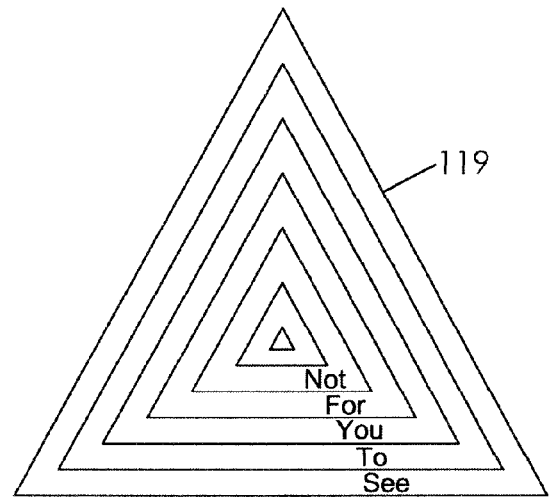
Figure 11G:
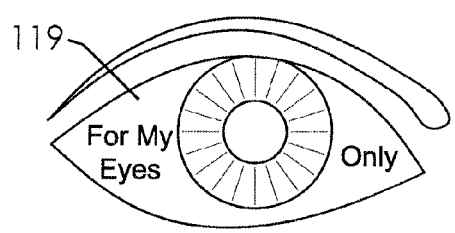
Figure 11I:
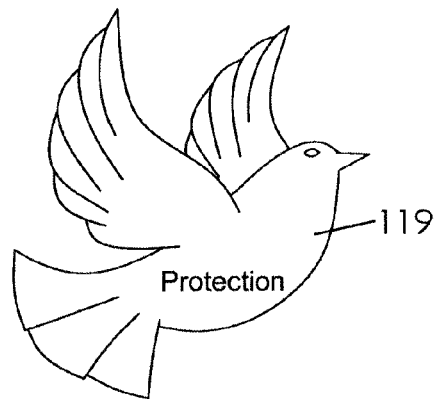
Figure 11H:
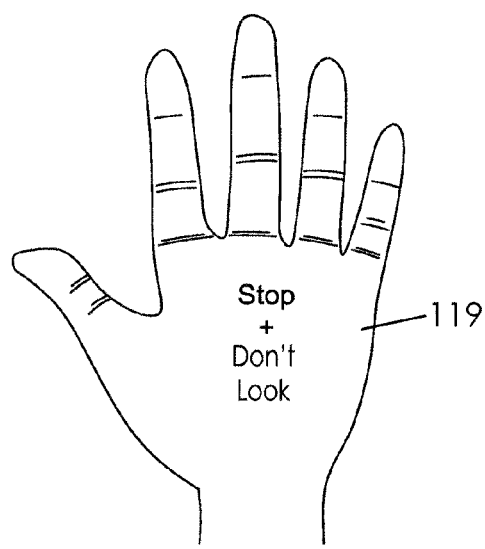
Figure 11J:
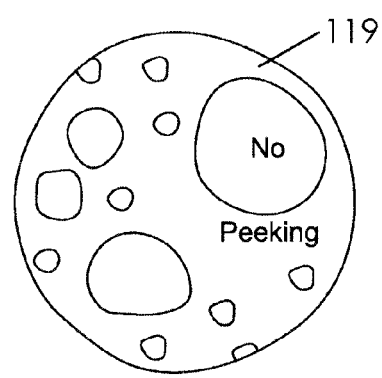

Still further, an embodiment includes the input device 102 causing the computing device 120 upon detecting a credential request to display a mask 119 on the computing device 120 adjacent to but not covering the credential request display field 121 (FIG. 9). As described immediately above, the displayed mask 119 may be associated with a respective user and a respective resource (i.e. website that requires logging in). In this embodiment, a user can use the input device 102 to confirm both his identify (biometrically or non-biometrically) and that the credential data is accurate for the respective credential request. Then, using the navigation tools of the computing device 120, such as a mouse or touch screen, the user may drag the mask 119 and its associated credential data onto the credential request display field 121 in order to initiate transmission of the credential data to the resource requesting it. Once transmission is complete, the resource becomes accessible to the user of the computing device 120 and the mask 119 is removed from view.

Now with specific reference to the credential data stored in the input device 102 or other memory resource, the credentials include at least one of a user name and password associated with the user or account. Additionally or alternatively the credentials include at least one of an account number, an address, a telephone number, a social security number, and an answer to a security question. The method further includes inserting a component containing the removable storage into a second input device for processing of at least one of biometric and non-biometric input entered by the user.

Turning to the figures, FIG. 1 depicts a system 100 of credential management and identity verification in accordance with an embodiment of the present disclosure. System 100 includes an input device 102, an application 110, a computing device 120, a network 130, and a remote resource 140.

Input device 102 is a portable electronic device that may be a pointing device for the computing device 120. Input device 102 may also be a mobile telephone, personal digital assistant (PDA), or a media player. Application 110 executes on input device 102 and includes components including at least an input component 112, verification files 114, a verification component 116, and stored credentials 118 which are described in detail hereinafter. It is understood that the application 110 may also have a component that executes on the computing device 120 in data communication with the input device 102. For instance, when the input device 102 transmits mask data and instructions regarding its display on the computing device 120, the component of the application residing on the computing device actually implements the instruction, especially in the embodiment described above where the mask 119 may be moved or manipulated by graphical user interface controls of the computing device 120.

While application 110 executing on input device 102 that provides much of the functionality of the present invention may be viewed as a software product, input device 102 may contain some hardware components that may be specially adapted to handle the tasks described herein. For example, while the verification component 116 described below compares user input with stored verification files 114 and may appear to be primarily a software function, in many embodiments hardware components of the input device 102 such as a processor and memory may be physically configured to handle specific requirements of the application 110 such as processing and comparison operations of the verification component 116 and storage and retrieval operations of verification files. The verification component 116, while described herein as a portion of the application 110, may have hardware aspects to it, for example customized and embedded processor functionality. Memory structures may be physically altered to specifically accommodate verification files 114.

Input device 102 also includes hardware and functionality to provide alerts to the user of computing device 120 when entry of biometric and/or non-biometric input is needed as described herein. Such hardware and functionality may include a visual device that illuminates, a speaker that emits an audible sound, and a vibratory component that emits a tactile sensation that alerts the user to provide input for verification leading to access to protected local or remote resources.

Computing device 120 may be a desktop computer. Computing device 120 may also be a laptop computer, tablet computer, or other portable computing device. Computing device 120 includes components including at least an internet browser 122 (which is computer software configured to display or interact with a remote resource via a network) and a local resource 124 which are described in detail hereinafter. Preferably, the computing device 120 is in data communication with the input device 102 as described herein.

Network 130 promotes communication between the components of the system 100. The network 130 may be any communication network including a public data network (PDN), a public switched telephone network (PSTN), a public land mobile network (PLMN), a private network, and/or a combination thereof including a wide area network such as the Internet.

Remote resource 140 may be a website, application, or other resource accessible by computing device 120 via the Internet or other public or private network including network 130. In an embodiment, remote resource 140 is a protected resource that requires at least one of username, password, electronic mail address, or other information from user of computing device 120 before access is granted to the user.

Figure 3:
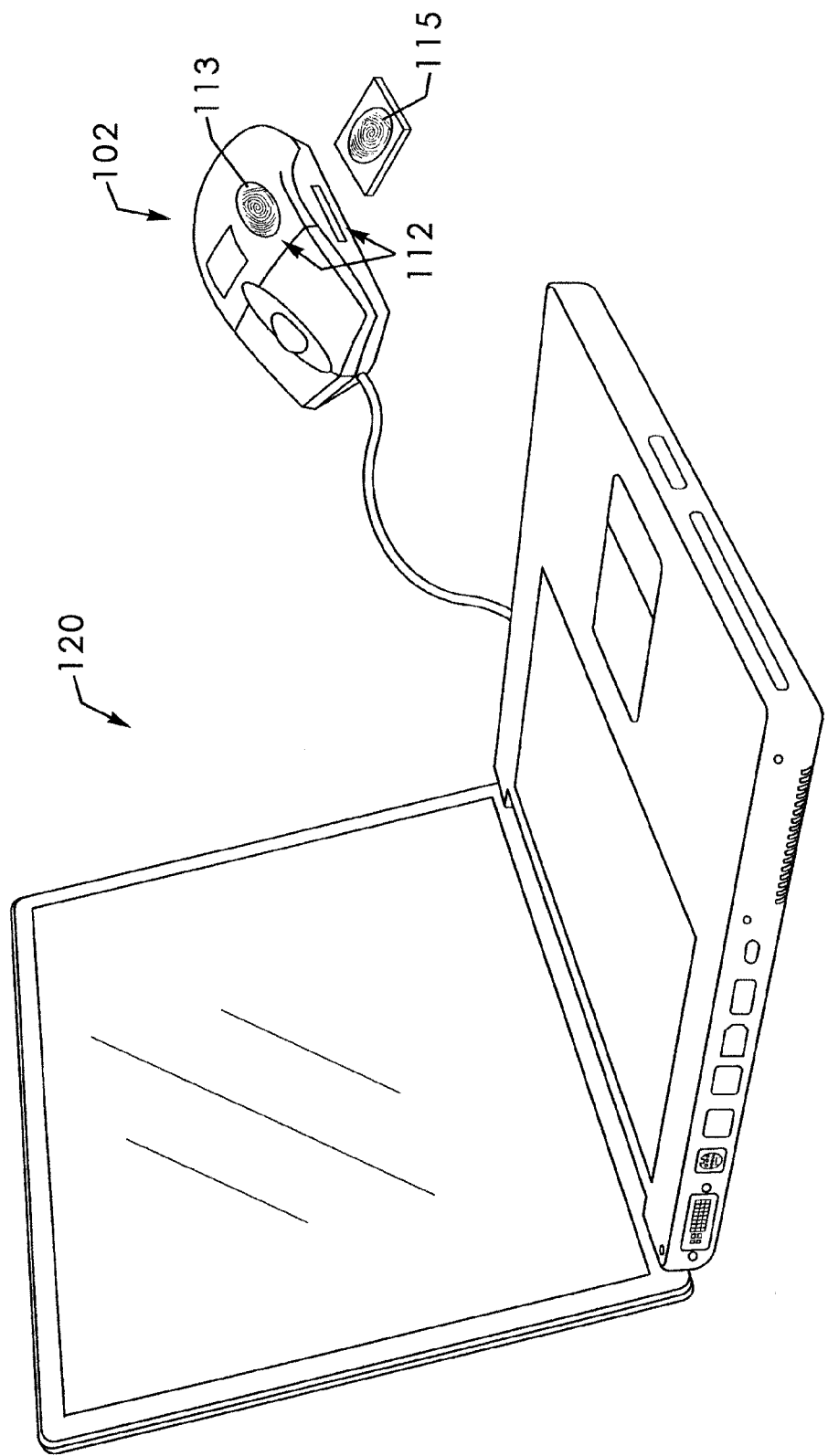
FIG. 3 illustrates a computing device in use with an input device according to the system of credential management and identity verification of FIG. 1.

The input component 112 of the input device 102 may include a data reader 113 adapted to accept a biometric input of the user of the computing device 120. The input component 112 may be a fingerprint reader or scanner (FIG. 3). When prompted, the user may place a fingerprint on the input component 112 which reads and assists in analyzing the fingerprint. The input component may also be adapted to identify another biometric attribute of the user, for example part of the user's eye, face, ear, or voice. The input device may be in the form of a remote input device 102a (FIG. 4) not coupled directly to the computing device 120 and not providing screen navigation utility as in the case of the computer mouse as described above. The remote input device 102a also includes the input component 112 which may include an auxiliary data reader 113a such as a fingerprint reader. In addition, the input component 112 of the remote input device 102*a* may include a speaker 112*a*, earphones, a microphone 112*b*, other sensors 112*c*, and other hardware and software to enable the user to make biometric entries to the input device 102 as discussed above. It is understood that the input device 102*a* may be in the form of a tablet computing device and include a touch screen and related capabilities.

Figure 5:
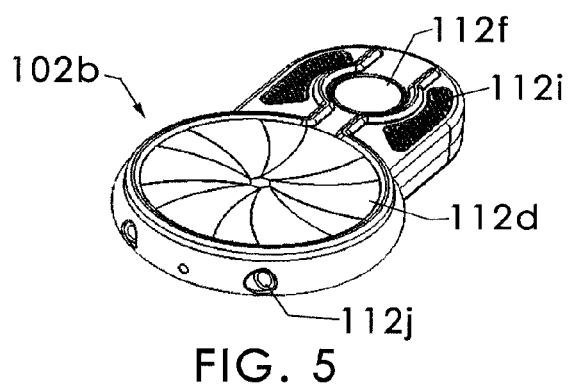
FIG. 5 is a perspective view of a multi-media input device according to the system of credential management and identity verification of FIG. 1.
Figure 6:
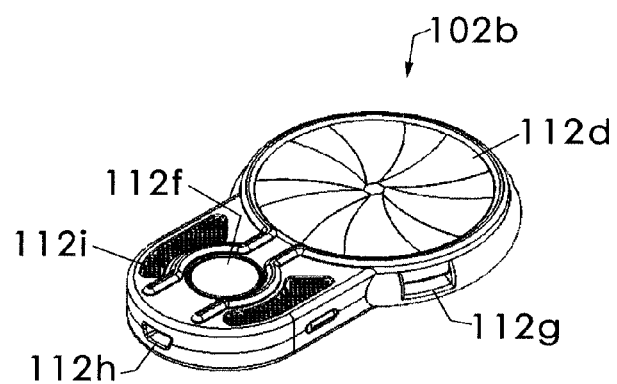
FIG. 6 is a perspective view of the multi-media input device from another angle as in FIG. 5.
Figure 7:
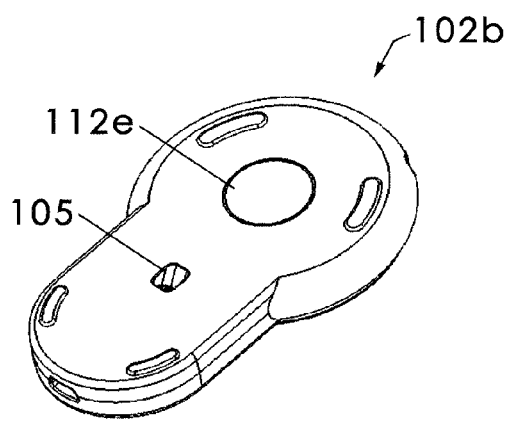
FIG. 7 is a bottom perspective view of the multi-media input device as in FIG. 6.

In another embodiment, the input device may be a multi-media input device 102*b* shown in FIGS. 5 through 7. The multi-media input device 102*b* may include a touch screen 112*d* as in the remote input device 102*a* described above although other size and shape configurations than shown would also work. Further, the multi-media input device 102*b* may include input and output components such as a non-biometric or key print scanner 112*f*, a card slot 112*g* for receiving a computer-readable data card (as described above), a mini-USB port 112*h*, a speaker 112*i*, an audio input jack 112*j* for receiving audio data, a biometric scanner 112*e*, and other data input and output features. The input device 102*b* includes circuitry or a processor configured to control each of the aforementioned data portals and components. Preferably, the multi-media input device 102*b* includes mouse optics 105 such that the input device 102*b* is functional as a wireless mouse for use with a computing device 120 as described previously.

The input component 112 of the input device 102 and remote input device 102*a* also accepts non-biometric input from the user of the computing device 120 upon the user's being prompted. More particularly, non-biometric input may include a small card 115 containing indicia which identifies the user or may be a key containing machine readable information. The card 115, key or other item of hardware may have a symbol resembling a fingerprint or may contain coding, graphics or other indicia identifying the user. The input component 112 is configured to read these and other non-biometric input. The small card 115 containing the indicia may be removably mounted to the input device 102 itself or it may be stored separately from the input device 102. For example, the small card 115 may have its own case, it may be stored on a keychain, or it may be a wearable item such as all or part of a piece of jewelry such as a ring or pendant.

Verification files 114 of the input device 102 are files stored in the input device 102 for comparison with biometric and non-biometric input entered by the user and read by the input component 112. Verification files 114 contain images of the user's fingerprint, recordings of user's voice, images of the user's face, or other impressions taken of the user when the input device 102 is being initialized to provide the services of the present invention. It is understood that the verification files 114 may be stored on the input device 102 at a point of initialization or upon a proactive user action to store them or to change previously stored files. When the user of the computing device 120 attempts to access a resource that requires credentials, the user is prompted by the input device 102 and enters at least one of biometric and non-biometric input. This input is compared with the verification files 114 previously loaded into the input device 102. Verification files 114 are stored in persistent, non-volatile storage of the input device 102. Verification files 114 may also be stored in removable storage that may be placed into a second input device 102 that has been enabled in the manner described herein.

In an embodiment, more than one user may use the computing device 120 in combination with the input device 102 and thereby benefit from the services described herein.

In that embodiment, separate sets of verification files 114 would be maintained for each user.

Mask data files 119 may also be stored in persistent, non-volatile storage (i.e. memory) of the input device 102. As indicated above, the mask data files 119 may be associated with one or more users. In other words, each user of the input device 102 may have one or more masks 119 associated with one or more resources that may, on occasion, send credential requests in response to a user's attempt to access the resource. When the input device 102 detects a credential request from a computing device 120 in data communication with the input device 102, the input device 102, under the control of the application 110, is configured to determine which mask 119 is associated with the user and with the respective resource.

The verification component 116 of the application 110 compares the at least one of biometric and non-biometric input entered by the user with verification files 114 previously stored in the input device 102. Verification files 114 may be input through a USB connection, such as shown at reference numeral 117 in FIG. 4. The verification component 116 makes a determination whether or not the at least one of biometric and non-biometric input entered by the user matches the verification files 114 for the user.

If the verification component 116 determines that the input entered by the user positively matches the corresponding verification files 114 for the user, the input device 102 accesses and transmits stored credentials 118 to the computing device 120. The stored credentials 118 transmitted are those needed by the particular resource or application being accessed by the user that requires a username and/or password, account number or whatever credential or other information is required to provide the user access to needed resources. The stored credentials 118 are encrypted and transmitted to the computing device 120 where they are entered into the appropriate field in the user's display. The user does not see the actual credentials as they are populated into the display field. Even more importantly, a "spectator" proximate the user does not see the stored credentials 118 when entered. Accompanying the stored credentials 118 may be a command such as "enter" that causes the computing device 120 to execute entry of the stored credentials 118 such that, for example, a username and password of the user are processed by an application or website accessed by the user wherein authentication is necessary.

Figure 8:
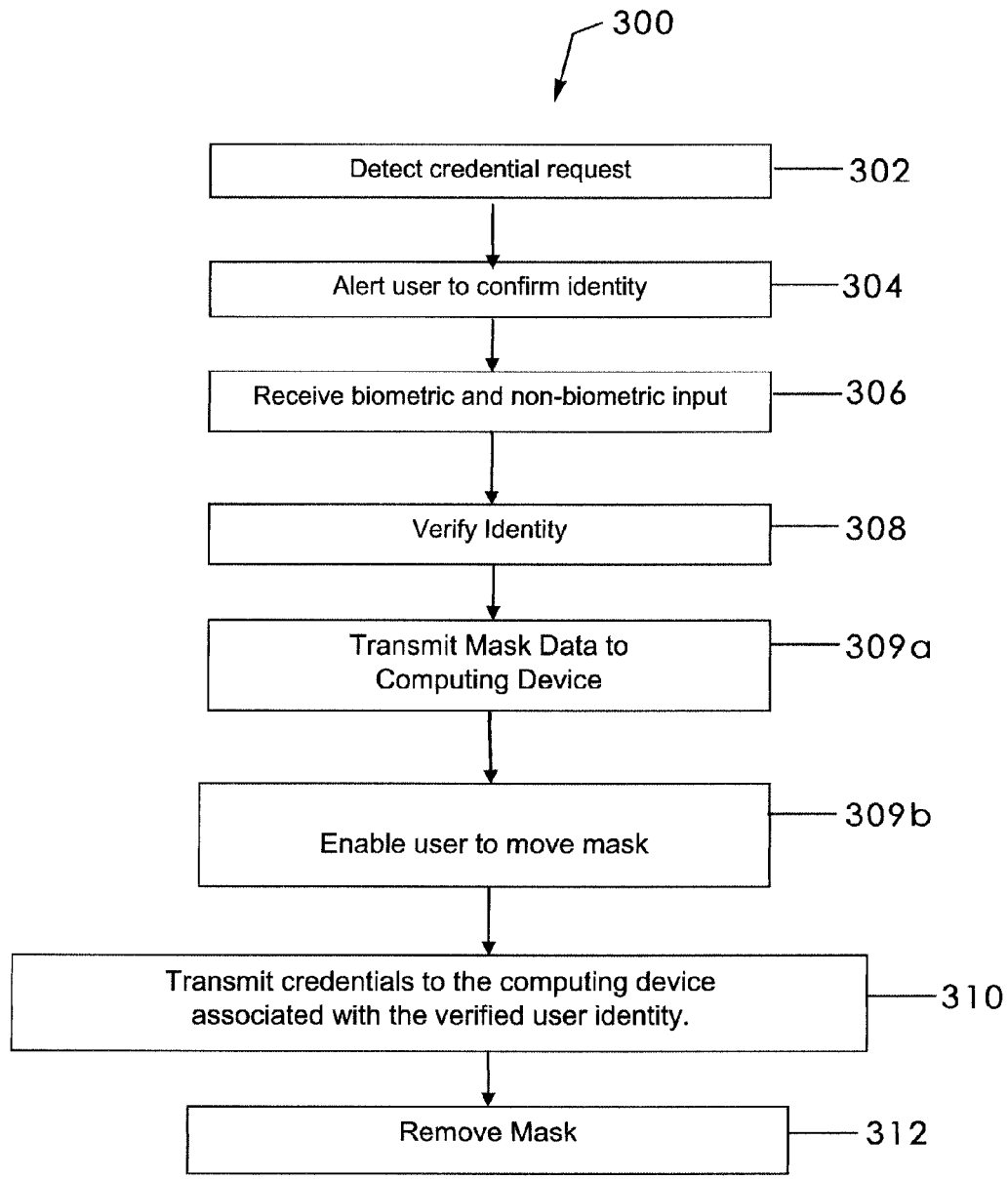
FIG. 8 is a flowchart of a method of credential management and identity verification in accordance with an embodiment of the present disclosure that illustrates use of a mask.

In the embodiment described previously, the user and spectators are further not able to see the stored credentials as they are populated into the credential request display field. Specifically, the respective mask 119 associated with the verified user and the respective resource is published to the display of the computing device 120 so as to hide the credential request display field. The modified method involving display of a mask is described in detail previously and the steps are illustrated in FIG. 8. While substantially similar to the flowchart of FIG. 2 (described later), the method 300 according to this embodiment includes step 309*a* in which the input device 102 directs a respective mask 119 to be publish to the display of the computing device 120—either directly atop the credential request display field 121 or adjacent thereto until moved by action of a user "dragging and dropping" it on the display field 121 (FIG. 10).

The browser 122 is a software component used on the computing device 120 by the user to explore Internet and other nonlocal resources across the network 130 as well as local resources 124 stored on the computing device 120. In some embodiments, the user may use software components other than the browser 122 to access both local resources 124 and remote resources 140.

Other information may be protected in addition to usernames, passwords, and account numbers. Such other information may include, for example, passport information, social security numbers, dates of birth, places of birth, family information, addresses, personal information numbers, safe combination numbers, answers to security questions, and personal identification numbers.

Figure 2:
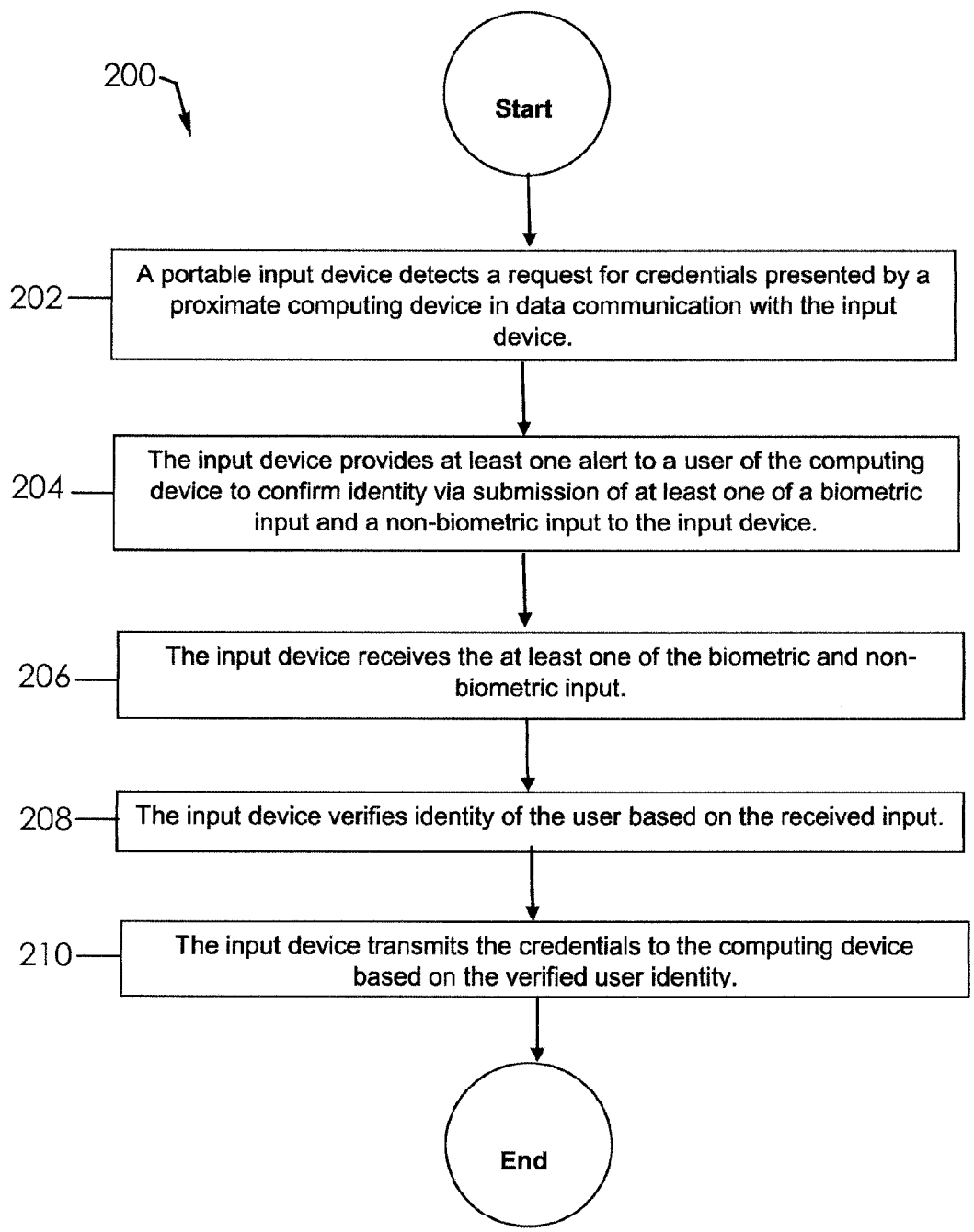
FIG. 2 is a flowchart of a method of credential management and identity verification in accordance with an embodiment of the present disclosure.

FIG. 2 is a flowchart depicting a method 200 in accordance with the present disclosure. Beginning at block 202, a portable input device detects a request for credentials presented by a proximate computing device in data communication with the input device. At block 204, the input device provides at least one alert to a user of the computing device to confirm identity via submission of at least one of a biometric input and a non-biometric input to the input device. At block 206, the input device receives the at least one of the biometric and non-biometric input. At block 208, the input device verifies the identity of the user based on the received input. At block 210, the input device transmits the credentials to the computing device based on the verified user identity. The method 200 terminates thereafter.

FIG. 3 is a system drawing depicting an embodiment in which the computing device 120 is a laptop computer. Input device 102 is shown nearby and is a computer mouse with input component 112 on the surface of the mouse and a removable storage device 115 shown nearby. In the embodiment illustrated in FIG. 3, the input device 102 is a computer mouse having the functionality of positioning an input symbol such as an arrow or cursor on the screen of the computing device 120 as well as having the functionality regarding entering credential data as described above.

Figure 4:
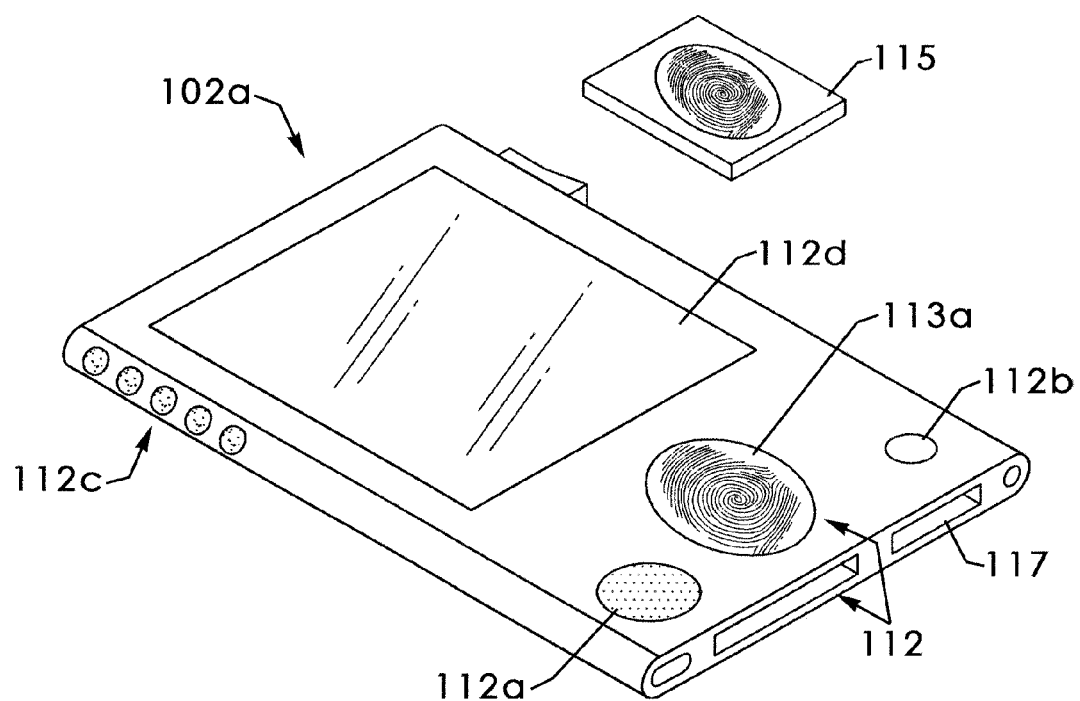
FIG. 4 is a perspective view of a remote input device according to the system of credential management and identity verification of FIG. 1.

FIG. 4 is an isolated view of a remote input device 102a described above. Specifically, the remote input device 102a is particularly configured to receive both biometric and non-biometric data as well as verification files as described above.

FIG. 5 is an isolated perspective view of a multi-media input device 102b described above. The remote input device 102b is particularly configured to receive both biometric and non-biometric data as well as verification files as described above. FIG. 6 shows the multi-media input device 102b from another angle to better show additional functional structures for receiving biometric and non-biometric data. Similarly, FIG. 7 is a bottom view of the multi-media input device 102b so as to show that the device may include functional structures common to a navigation device such as a computer mouse optics 105 as described above.

FIG. 8 is a flowchart depicting a method 300 in accordance with the present disclosure. The method 300 is substantially similar to the method 200 as in FIG. 2 except for the additional steps related to utilizing a mask 119 to visually block or overlay a credential display field. Beginning at block 202, a portable input device detects a request for credentials presented by a proximate computing device in data communication with the input device. At block 304, the input device provides at least one alert to a user of the computing device to confirm identity via submission of at least one of a biometric input and a non-biometric input to the input device. At block 306, the input device receives the at least one of the biometric and non-biometric input. At block 308, the input device verifies the identity of the user based on the received input. At block 310, the input device transmits the credentials to the computing device based on the verified user identity. There, the credentials may populate the credential request display field or just be automatically transmitted to the requesting resource. Finally, the mask 119 may be removed or "unpublished" at block 312 in that the need for secrecy has passed. The method 300 terminates thereafter.

FIG. 9 is an illustration of the embodiment of the present system and method in which a mask 119 is published to a display of the computing device 120 but not positioned yet atop a credential request display field 121. FIG. 10 is another illustration as in FIG. 9 showing a mask 119 positioned atop the credential request display field 121 so as to block a view thereof. FIGS. 11A to 11J illustrate examples of various masks that can be stored in and used by the input device 102.

It is understood that while certain forms of this invention have been illustrated and described, it is not limited thereto except insofar as such limitations are included in the following claims and allowable functional equivalents thereof.

What is claimed is:

1. A system of credential management and identity verification for use with a computing device, comprising:
    a portable input computing device in data communication with the computing device, said portable input computing device being configured to store a plurality of credentials and to store a plurality of user-supplied mask data;
    an application that, when executed on the portable input computing device:
        detects a request for credentials being published on a display of the computing device, wherein said portable input computing device receives the request for credentials in response to the computing device accessing at least one of a locally accessible resource, a resource accessible via a network, and a resource accessible via the Internet;
        provides at least one alert to a user of the computing device to confirm identity via submission of at least one of a biometric and a non-biometric input to the input device;
        receives the at least one of the biometric and non-biometric input;
        verifies identity of the user based on the received input;
        transmits respective mask data associated with the verified user identity to the computing device that is configured to visually block said request for credentials;
        transmits respective credentials to the computing device associated with the verified user identity;
    wherein said application, when executed on said portable input computing device:
        detects an identity of a source of said request for credentials;
        determines respective mask data associated with the verified user identity and the identified source; and
        transmits said determined mask data to the computing device that is associated with both the verified user identity and the identified source.

2. The system of claim 1, wherein said application, wherein said respective mask data transmitted to the computing device includes instructions to display said respective mask data directly in front of said request for credentials so as to completely visually block said request for credentials and to block said transmitted credentials.

3. The system of claim 1, wherein said application, wherein said respective mask data transmitted to the computing device includes instructions to display said respective mask data adjacent said request for credentials so as to completely visually block said request for credentials and to block said transmitted credentials only if said transmitted mask data is moved in front of said request for credentials using a graphic user interface of the computing device.

4. The system of claim 1, wherein said portable input computing device provides the at least one alert using at least one of a visible, audible, and vibratory signal.

5. The system of claim 1, wherein the portable input computing device transmits the credentials in encrypted format and does not reveal the credentials to the user.

6. The system of claim 4, wherein the portable input computing device provides alerts customized for each of the plurality of users of the computing device.

7. The system of claim 1, wherein the portable input computing device communicates with the computing device via at least one of a wired and wireless connection.

8. The system of claim 1, wherein the portable input computing device is a pointing device in data communication with the computing device.

9. The system of claim 1, wherein:
the biometric input comprises a fingerprint of the user; and
the non-biometric input comprises machine-readable indicia provided by a portable card.

10. A method of credential management and identity verification for use with a computing device, comprising:
providing a portable input computing device in data communication with the computing device detecting a request for credentials that is being displayed upon a display of the computing device, said portable input computing device being configured to store a plurality of credentials and a plurality of mask data,
receiving by an application the request for credentials in response to the computing device accessing at least one of a locally accessible resource, a resource accessible via a network, and a resource accessible via the internet;
providing by said portable input computing device at least one alert to a user of the computing device to confirm identity via submission of at least one of a biometric input and a non-biometric input to the portable input computing device;
receiving by said portable input computing device the at least one of the biometric and non-biometric input;
verifying by said portable input computing device an identity of the user based on the received input;
determining by said portable input computing device respective mask data associated with the verified user identity;
transmitting by said portable input computing device said mask data associated with the verified user identity to the computing device that is configured to visually block said request for credentials;
transmitting by said portable input computing device the credentials to the computing device based on the verified user identity;
said application detecting an identity of a source of said request for credentials;
said application determining respective mask data associated with the verified user identity and the identified source; and
transmitting by said application said determined mask data to the computing device that is associated with both the verified user identity and the identified source.

11. The method of claim 10, further comprising said application transmitting to the computing device instructions to display said respective mask data directly in front of said request for credentials so as to completely visually block said request for credentials and to block said transmitted credentials.

12. The method of claim 10, further comprising said application transmitting to the computing device instructions to display said respective mask data directly adjacent said request for credentials so as to completely visually block said request for credentials and to block said transmitted credentials only if said transmitted mask data is moved in front of said request for credentials using a graphic user interface of the computing device.

13. The method of claim 10, further comprising the portable input computing device transmitting the credentials in encrypted format and wherein the credentials are not revealed to the user.

14. The method of claim 10, wherein the portable input computing device verifies the identity of the user by comparing the at least one of said biometric input and said non-biometric input with files stored in at least one of persistent storage of said input device and removable storage of said input device.

15. The method of claim 10, further comprising said portable input computing device transmitting credentials for a second user of said computing device based on the second user accessing at least one resource accessible locally on the computing device, accessible via a network, and accessible via the Internet and further based on said input device verifying at least one of said biometric and said non-biometric input entered by the second user.

16. The method of claim 10, further comprising said portable input computing device transmitting credentials to a second computing device based on a third user of said second computing device accessing at least one resource accessible locally on said second computing device, accessible via a network, and accessible via the Internet and further based on said input device verifying at least one of said biometric and said non-biometric input entered by the third user.

17. The method of claim 10, further comprising said portable input computing device detecting the request for credentials based on user action comprising at least one of navigating about an Internet page containing an authentication prompt, hovering a cursor over an authentication prompt, and clicking within a field accepting the credentials.

18. The method of claim 17, wherein said portable input computing device recognizes an account associated with the user action and searches for stored files to compare with the at least one of said biometric and said non-biometric input entered by the user.

19. The method of claim 18, wherein the credentials comprise at least one of a user name and password associated with the account and wherein additionally or alternatively the credentials comprise at least one of an account number, an address, a telephone number, a social security number, and an answer to a security question.

* * * * *